(No Model.) 2 Sheets—Sheet 1.
J. ELLIS.
THRASHING MACHINE.

No. 336,400. Patented Feb. 16, 1886.

Witnesses:
George E. Gibson
Harry Drury

Inventor:
John Ellis
by his Attorneys
Howson & Sons

N. PETERS, Photo-Lithographer, Washington, D. C.

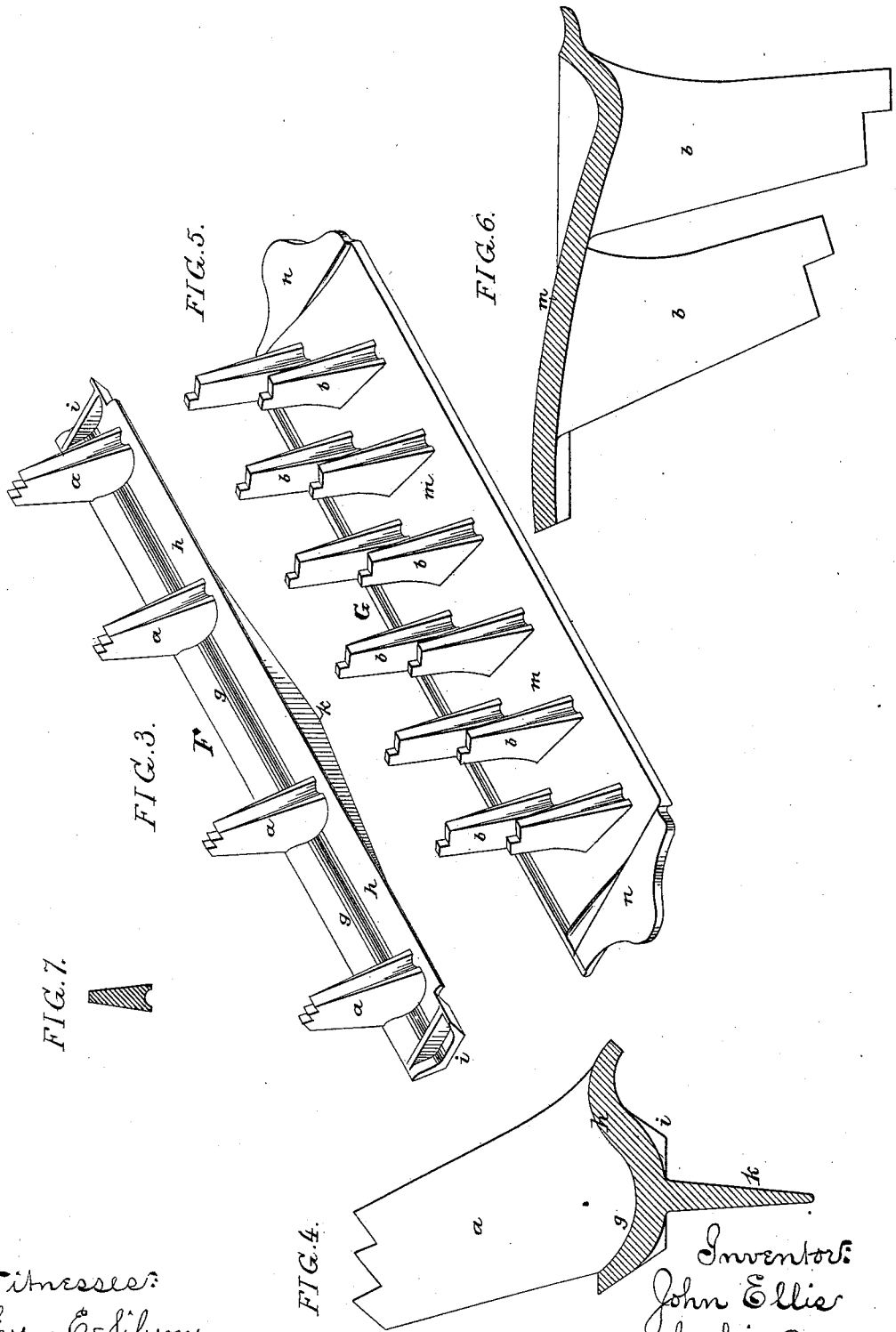

UNITED STATES PATENT OFFICE.

JOHN ELLIS, OF EAST COVENTRY, PENNSYLVANIA, ASSIGNOR TO GEORGE B. ELLIS, OF SAME PLACE.

THRASHING-MACHINE.

SPECIFICATION forming part of Letters Patent No. 336,400, dated February 16, 1886.

Application filed June 20, 1885. Serial No. 169,265. (No model.)

*To all whom it may concern:*

Be it known that I, JOHN ELLIS, a citizen of the United States, and a resident of East Coventry, Chester county, Pennsylvania, have invented certain Improvements in Thrashing-Machines, of which the following is a specification.

My invention relates to the toothed cylinder-bar and toothed concave-bar of the machine, and to the means of hanging the latter, the object of my improvements being to construct strong and cheap toothed bars for the cylinder and concave, and to so hang the latter that it will yield readily when subjected to undue pressure.

Figure 1:
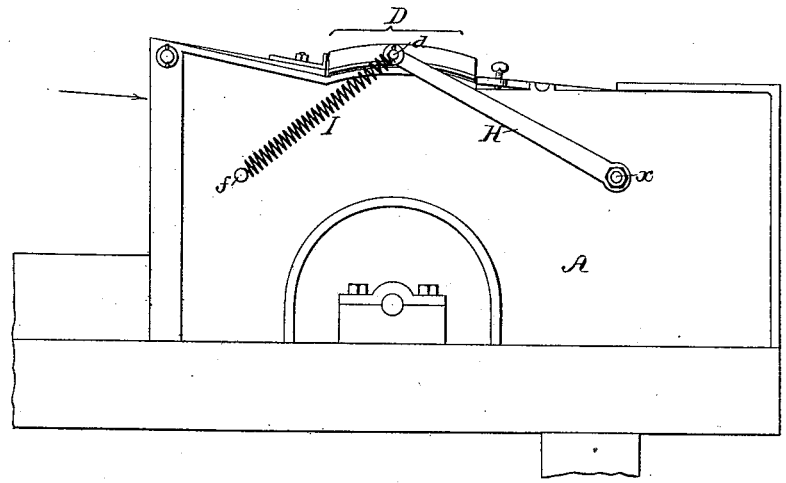
Figure 2:
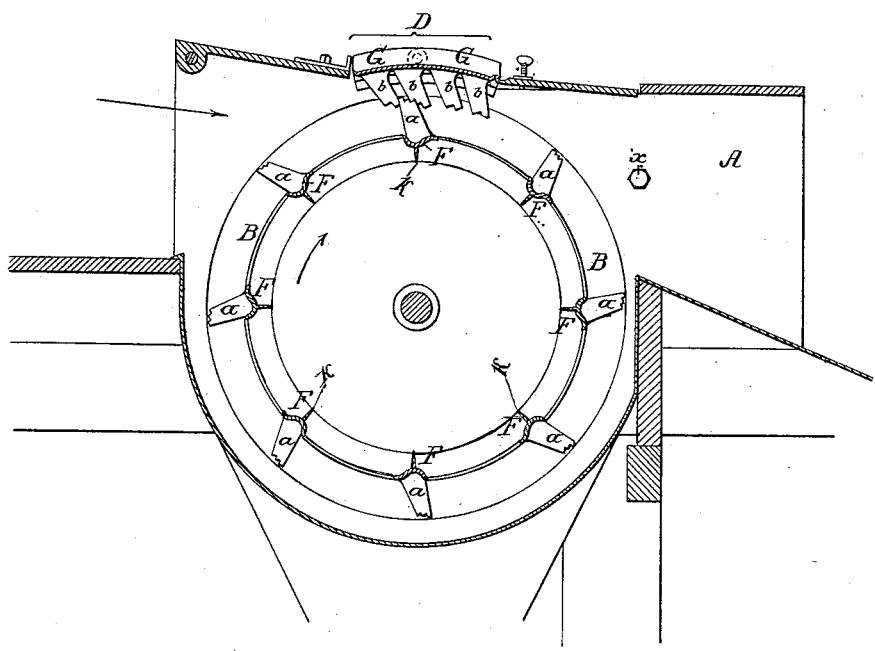

In the accompanying drawings, Figure 1 is a side view of sufficient of a thrashing-machine to illustrate one feature of my invention; Fig. 2, a longitudinal section of the same; Fig. 3, a perspective view of one of the toothed bars of the cylinder; Fig. 4, a transverse section of the same on an enlarged scale; Fig. 5, an inverted perspective view of one of the toothed bars of the concave; Fig. 6, an enlarged transverse section of said bar, and Fig. 7 a sectional plan view of one of the teeth.

A represents part of the casing of the machine; B, the rotating cylinder, and D the concave.

The cylinder consists of opposite end frames carrying horizontal bars F, each of which has a series of teeth, $a$, and the concave consists of a frame carrying transverse bars G, from each of which project a series of teeth, $b$, the teeth of the bars F being so arranged that when the cylinder revolves said teeth will pass between those of the concave.

To each end of the concave-frame is connected the upper end of an arm, H, the lower end of which is pivoted to the casing A at a point, $x$, in rear of the concave, a coiled spring, I, being attached at the upper end to the pin $d$, whereby the concave is hung to the arm H, and at the lower end to a pin, $f$, on the casing at a point in front of the concave. While the concave is thus held down to its proper position during the ordinary working of the machine, it is at liberty to yield when undue pressure is exerted upon it—as, for instance, when foreign substances are introduced into the machine with the grain. Owing to this method of hanging the concave the latter will yield in a direction substantially tangential to the arc of a circle traversed by the toothed cylinder-bars, this being the most desirable direction, as it is directly in the line of thrust, and thus permits the elevation of the concave and the freeing of the foreign substances from the influence of the teeth of the cylinder as rapidly as possible.

Each of the cylinder-bars F consists of a web presenting reverse curves $g$ and $h$, and the bar terminates at opposite ends in angular projections $i$, which are adapted to and are secured in suitable sockets in the end frames of the cylinder, so as to prevent the web from turning.

The teeth $a$ are notched at the ends, and are grooved on the front or acting edges, as shown in Figs. 3 and 7, each tooth being tapered transversely from base to point and from front to rear, so as to be self-clearing. The notched ends of the teeth form transverse ribs, which assist in dislodging the grain from the straw, and the recesses in the front edges of the teeth cause the latter to present narrow acting faces instead of the broad plain faces, which would be presented in the absence of such recesses.

Owing to the shape of the web of the bar F said bar possesses great strength, the bar being transversely braced on the outer side by the teeth $a$, which are cast with the web, and longitudinally stiffened by a tapered longitudinal rib, $k$, cast on the back of the web.

The teeth $b$ of each concave-bar are similar in form to the teeth $a$, and said concave-bar consists of a curved web, $m$, having at each end a projecting plate, $n$, for attachment to the frame of the concave.

The teeth $b$ are arranged in parallel rows on the web $m$ of the concave-bar, and are staggered—that is to say, the teeth of one row are in line with the spaces between the teeth of the other row, the rear edges of the teeth of the front row extending to the line of the front edges of the teeth of the rear row—as shown in Fig. 6—so as to stiffen all portions of the web $m$ of the concave-bar.

I claim as my invention—

1. The combination of the cylinder of a thrashing-machine, a concave, arms carrying the said concave and pivoted below and in the rear of the same, and springs acting upon said arms and tending to depress them, as set forth.

2. The within-described cylinder-bar, consisting of a web presenting reverse curves $g$ and $h$, and having projecting teeth, as set forth.

3. The within-described cylinder-bar, consisting of a web presenting reverse curves $g$ and $h$, and having projecting teeth cast therewith, and forming transverse braces therefor, as specified.

In testimony whereof I have signed my name to this specification in the presence of two subscribing witnesses.

JOHN ELLIS.

Witnesses:
  JOS. H. KLEIN,
  HARRY SMITH.